No. 712,530. Patented Nov. 4, 1902.
J. HERFERT.
CURRYCOMB.
(Application filed June 4, 1901.)

(No Model.)

WITNESSES:
E. C. Carlsen.
D. E. Carlsen.

INVENTOR.
Joseph Herfert.
BY his ATTORNEY:
A. M. Carlsen.

UNITED STATES PATENT OFFICE.

JOSEPH HERFERT, OF TUCKER, WASHINGTON.

CURRYCOMB.

SPECIFICATION forming part of Letters Patent No. 712,530, dated November 4, 1902.

Application filed June 4, 1901. Serial No. 63,067. (No model.)

*To all whom it may concern:*

Be it known that I, JOSEPH HERFERT, a citizen of the United States, residing at Tucker, in the county of Cowlitz and State of Washington, have invented certain new and useful Improvements in Currycombs; and I do declare the following to be a full, clear, and exact description of the invention, such as will enable others skilled in the art to which it appertains to make and use the same, reference being had to the accompanying drawings, and to the figures of reference marked thereon, which form a part of this specification.

My invention relates to improvements in currycombs; and the objects of the invention are, first, to provide a currycomb through the teeth of which a flow of liquid may be distributed upon the skin of the animal on which the comb is used; second, to provide such currycomb with means adapting it to be used in connection with or independent of a hose; third, to provide such currycomb with means for straining the oil, medicated water, or other germ and insect exterminating fluid passing through the comb and its teeth. These and other objects I attain by the novel construction and arrangement of parts illustrated in the accompanying drawings, in which—

Figure 1:
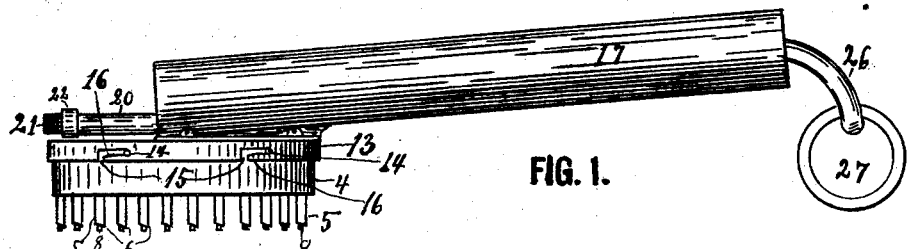
Figure 2:
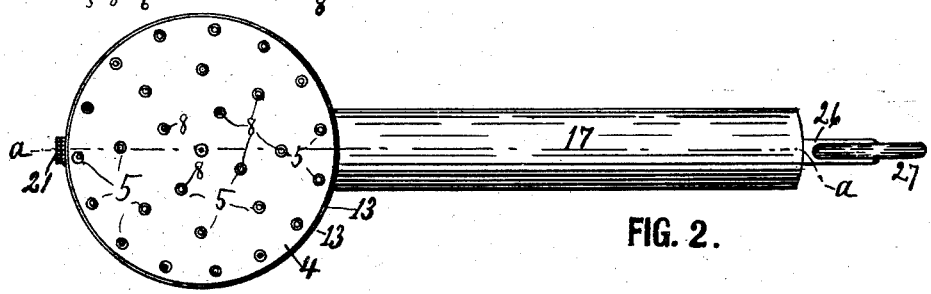
Figure 3:
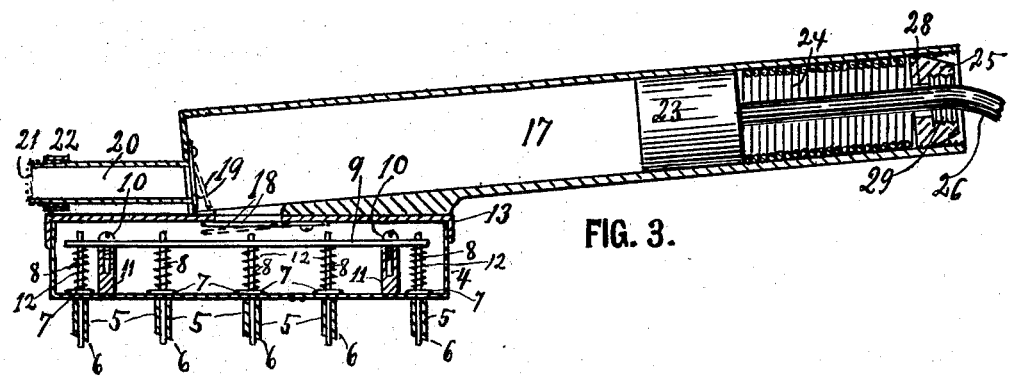

Figure 1 is a side view of my improved currycomb. Fig. 2 is a bottom or face view of Fig. 1. Fig. 3 is a longitudinal sectional view about as on the line $a\,a$ in Fig. 2 with only a few of the teeth of the comb shown.

Referring to the drawings by reference-numerals, 4 is a preferably cylindrical vessel, to the bottom of which are secured the comb-teeth 5, which consist of small tubes beveled at their free ends to form comparatively sharp points 6 at the edges nearest the handle. The inner ends of said tubes are normally closed by the valves 7, secured on rods 8, of which the inner ends are guided in holes in a plate 9, secured by screws 10 and posts 11 to the bottom of the vessel, while the outer ends of the rods project slightly beyond the points of the teeth, in which position they are held by the springs 12, interposed between the valves and the plate 9 upon each valve rod or stem 8. The vessel is closed by the cover 13, which may be screw-threaded on or secured in any suitable manner making it water-tight. I prefer in a cheap grade of the comb to simply provide the vessel with pins or projections 14, (see Fig. 1,) which enter upward into notches 15 in the cover, and draw the vessel and cover tightly together by giving the cover a turning motion, so that the inclines 16 are forced in under and past the pins 14 till the pins are lodged as shown.

Upon the cover 13 is secured the hollow handle 17, from which liquid may pass into the vessel through the valve 18 and into which liquid may be filled through the valve 19 from the small inlet-tube 20, the end of which is covered with a straining-cloth 21, held over the open end of the pipe by the ring 22, forced upon the cloth on the taper end of the tube. In connection with said strainer and valve 19 I use a plunger or piston 23, fitting in the handle and pressed normally forward by a coiled spring 24, compressed between the piston and the collar 25, which is screw-threaded into the end of the handle and has a central opening 28 for the passage of the rope 26, having secured to its ends the ring 27, by the pulling at which the spring is compressed and the plunger retracted, so that the liquid fills the handle through the valve 19 (from the supply vessel) and is then gradually pressed by the plunger and the spring 24 down through the valves 18 and 7 as often as the valves 7 are opened by pressure of the outer ends of the valve-rods 8 against the body of the horse, cow, sheep, or other animal operated upon.

Where it is convenient or where a large number of animals are to be operated upon, it is preferable to let the liquid flow into the comb through a hose from an elevated vessel. In such cases the collar 25 is screwed out, while the plunger 23 and the rope 26 are removed. The collar 25 is then replaced and into its coarse threads 29 is screwed the end of the hose. Parties not wanting the spring and plunger arrangement may thus buy the comb without it, and if such parties are found to be many the tube 20 and valve 19 may also be dispensed with in one grade of the combs, and in such grade or class the attaching-point for the hose may be upon any desired place of the handle or even the vessel or its cover.

It is obvious that the shape of the valves and many other parts may be considerably changed without diverging from the spirit of my invention.

Having thus described my invention, what I claim, and desire to secure by Letters Patent, is—

1. In a currycomb, the combination with a hollow vessel adapted to contain liquid under pressure, and means for distributing the liquid through the teeth of the comb when the comb is in use, of a hollow handle, a piston or plunger within the handle and a flexible rod secured to the piston and projecting out of the handle, a coiled spring arranged to drive the piston forward in the handle, a removable collar in the end of the handle to retain the spring, said collar having screw-threads adapting it to receive the end of a hose, a valve-closed inlet at the front end of the handle and a valve-closed outlet from the handle into the vessel of the comb.

2. In a currycomb of the class described, the combination with a hollow comb-body of a handle forming a pump with spring-pressed piston, a valve opening from the handle into the comb-body, and another valve, 19, opening into the handle, an inlet-tube 20 facing with one end the valve 19 and having at its free end a strainer, substantially as and for the purpose set forth.

In testimony whereof I affix my signature in presence of two witnesses.

JOSEPH HERFERT.

Witnesses:
H. N. PEABODY,
L. W. CARNER.